United States Patent
Bhardwaj

(10) Patent No.: US 7,873,045 B2
(45) Date of Patent: Jan. 18, 2011

(54) GENERATING AN ENCAPSULATING HEADER BASED ON ENCAPSULATED INFORMATION PROVIDED AT PROTOCOL-DEPENDENT LOCATIONS

(75) Inventor: Sanjay Bhardwaj, Fremont, CA (US)

(73) Assignee: Exar Corporation, Fremont, CA (US)

( * ) Notice: Subject to any disclaimer, the term of this patent is extended or adjusted under 35 U.S.C. 154(b) by 1328 days.

(21) Appl. No.: 10/662,583

(22) Filed: Sep. 15, 2003

(65) Prior Publication Data

US 2005/0068948 A1    Mar. 31, 2005

(51) Int. Cl.
*H04L 12/28* (2006.01)
*H04L 12/56* (2006.01)
*G06F 15/16* (2006.01)
*G06F 15/173* (2006.01)

(52) U.S. Cl. .................. 370/392; 370/394; 709/238; 709/246

(58) Field of Classification Search .......... 370/392, 370/394; 709/238, 246
See application file for complete search history.

(56) References Cited

U.S. PATENT DOCUMENTS

| | | | | |
|---|---|---|---|---|
| 5,293,330 | A * | 3/1994 | Sayegh .................. | 708/406 |
| 5,467,342 | A * | 11/1995 | Logston et al. .......... | 370/253 |
| 5,938,736 | A * | 8/1999 | Muller et al. ............ | 709/243 |
| 6,085,238 | A * | 7/2000 | Yuasa et al. ............. | 709/223 |
| 6,496,505 | B2 * | 12/2002 | La Porta et al. ......... | 370/392 |
| 6,567,404 | B1 | 5/2003 | Wilford | |
| 6,570,884 | B1 * | 5/2003 | Connery et al. .......... | 370/419 |
| 6,618,366 | B1 * | 9/2003 | Furukawa et al. ........ | 370/338 |
| 6,618,397 | B1 * | 9/2003 | Huang .................... | 370/474 |
| 6,738,821 | B1 * | 5/2004 | Wilson et al. ............ | 709/230 |
| 6,778,495 | B1 * | 8/2004 | Blair ..................... | 370/230 |
| 6,850,495 | B1 * | 2/2005 | Baum et al. ............. | 370/256 |
| 6,882,654 | B1 * | 4/2005 | Nelson .................... | 370/401 |
| 6,993,026 | B1 * | 1/2006 | Baum et al. ............. | 370/392 |
| 7,031,904 | B1 * | 4/2006 | Wilson et al. ............ | 709/230 |
| 7,379,454 | B2 * | 5/2008 | Ogasawara et al. ...... | 370/389 |
| 7,395,346 | B2 * | 7/2008 | Pinder et al. ............ | 709/232 |
| 7,519,834 | B1 * | 4/2009 | Dondeti et al. .......... | 713/193 |
| 7,570,643 | B2 * | 8/2009 | Prasad et al. ............ | 370/392 |
| 2001/0033580 | A1 * | 10/2001 | Dorsey et al. ........... | 370/466 |
| 2002/0124095 | A1 * | 9/2002 | Sultan .................... | 709/230 |
| 2003/0152076 | A1 * | 8/2003 | Lee et al. ................ | 370/389 |

FOREIGN PATENT DOCUMENTS

WO    WO99/00820    A    1/1999
WO    WO01/37489    A    5/2001

OTHER PUBLICATIONS

European Communication for Application No. EP04764950.4, date Jun. 23, 2006, 4 pages.
European Communication for Application No. EP04764950.4, date Jan. 31, 2007, 6 pages.
European Communication for Application No. EP04764950.4, date Feb. 1, 2010, 4 pages.

* cited by examiner

*Primary Examiner*—Alpus H Hsu
(74) *Attorney, Agent, or Firm*—Townsend and Townsend and Crew LLP

(57) ABSTRACT

An encapsulation packet is received as a sequence of parallel data segments. First information within the encapsulated packet is obtained based on second information indicative of a location of the first information within the encapsulated packet. The encapsulating header is modified based on the first information.

20 Claims, 3 Drawing Sheets

GENERATING AN ENCAPSULATING HEADER BASED ON ENCAPSULATED INFORMATION PROVIDED AT PROTOCOL-DEPENDENT LOCATIONS

FIELD OF THE INVENTION

The invention relates generally to packet-based communication and, more particularly, to communications involving encapsulated packets.

BACKGROUND OF THE INVENTION

Encapsulation techniques are commonly used in packet communications. For example, a first packet produced according to a first packet communication protocol can be encapsulated by prepending thereto a packet header corresponding to a second packet communication protocol. The result is an encapsulation packet. The prepended header is also referred to herein as an encapsulating header, and the first packet is also referred to herein as an encapsulated packet. Thus, the encapsulation packet consists of an encapsulating header and a payload, and the encapsulated packet is the payload.

Encapsulation is utilized in various conventional packet communication applications, for example in the OSI hierarchical layered model. In the OSI hierarchical model, a layer 2 packet is an encapsulation packet produced by prepending a layer 2 header to a layer 3 packet, thereby encapsulating the layer 3 packet. In the OSI model, layer 2 represents the data link layer whose primary responsibility in networked communication is to perform encoding/decoding for packet integrity and to deliver packets "in order" to layer 3. In terms of packet processing, layer 2 represents the switching layer, wherein packets are processed based on layer 2 MAC (media access control) addresses.

Layer 3 of the OSI architecture model is the routing layer or network layer. This is the layer that runs shortest/optimal path routing algorithms. Layer 3 performs the function of end-to-end delivery of each packet through various nodes.

Any layer 2 device includes a mechanism which sends/receives packets to/from layer 3 to complete the termination function.

Layer 3 is often implemented in part through invocation of an embedded processor or a dedicated network processor. As mentioned above, among other functions, layer 3 can run a routing algorithm to determine an optimal switching route for packets from a source IP address to a destination IP address. At each termination and switching point within the communication network, the layer 2 (MAC) addresses in the layer 2 header are updated so that the packet(s) will travel correctly from point to point along the associated switching route produced by the routing algorithm. The aforementioned layer 2 addresses are carried in the layer 2 header which has been prepended to the layer 3 packet in order to encapsulate the layer 3 packet.

Furthermore, in order to support logical groupings of addresses and multicasting, the aforementioned layer 2 address can be dependent on the layer 3 IP address, which layer 3 IP address is carried in the header of the encapsulated layer 3 packet. Thus, in conventional layer 2/layer 3 OSI operations, information from within the encapsulated (layer 3) packet may be needed in order to produce the encapsulating (layer 2) header. The position of the layer 3 IP address is not necessarily fixed within the layer 3 packet. The position of the layer 3 IP address depends on the protocol that is being run at layer 3. Different layer 3 protocols position the layer 3 IP address at different locations within the layer 3 packet. Moreover, even with a fixed protocol, a protocol version upgrade or change can cause the position of the layer 3 IP address to change within the layer 3 packet. An example of a protocol change would be when the protocol moves from IPV4 to IPV6.

Thus, in some conventional layer 2/layer 3 OSI operations, the layer 2 device, in order to generate the layer 2 address, must be able to obtain the layer 3 IP address from various possible positions within the layer 3 packet.

FIG. 1 illustrates a conventional example of modifying the encapsulating header of an encapsulation packet based on information within the encapsulated packet. In the example of FIG. 1, an original encapsulation packet 11, in this example, a layer 2 packet whose payload is a layer 3 packet, is transformed into a resulting encapsulation packet 13, again, in this example, a layer 2 packet whose payload is a layer 3 packet. In FIG. 1, the reference character L2 designates layer 2, and the reference character L3 designates layer 3. In the example of FIG. 1, the data channel is eight bytes wide, and the packets 11 and 13 are therefore formatted as a sequence of 8-byte wide parallel data segments or doublewords, beginning with the first (top in FIG. 1) doubleword of the layer 2 header and thereafter continuing with the remaining doublewords from top to bottom as shown in FIG. 1. The layer 2 packets at 11 and 13 in FIG. 1 can consist of, for example, 64 bytes (8 doublewords) or 128 bytes (16 doublewords). The layer 2 header includes two 2-byte RPR headers designated as HDR1 and HDR2, a six-byte source address, and two-bytes of HEC.

In the example of FIG. 1, the resulting encapsulation packet 13 is obtained from the original encapsulation packet 11 by modifying predetermined bytes of the encapsulating (layer 2) header based on information within the encapsulated (layer 3) packet. More particularly, three predetermined bytes D in the layer 2 destination address of the encapsulating (layer 2) header are replaced by three consecutive bytes from the layer 3 IP destination address of the encapsulated (layer 3) packet, thereby producing the resulting packet 13. However, and as mentioned above, the layer 3 IP destination address (designated by reference numerals 3) can be positioned differently within the layer 3 packet according to the different available layer 3 protocols, and even according to different versions of a fixed protocol.

Accordingly, the transformation from the original encapsulation packet 11 to the resulting encapsulation packet 13 must be able to locate the desired, flexibly positionable bytes of the layer 3 IP destination address. Some conventional approaches to this problem use the "brute force" solution of providing a unique design for each possible layer 3 protocol or version thereof. Other conventional approaches attempt to guess the layer 3 protocol that is being used, and some even transfer the function to software, which is inherently slow.

It is desirable in view of the foregoing to provide the capability of modifying an encapsulating header based on information that is flexibly positionable within the encapsulated packet, while also avoiding the aforementioned difficulties of conventional approaches.

SUMMARY OF THE INVENTION

According to exemplary embodiments, the encapsulation packet is received as a sequence of parallel data segments. First information within the encapsulated packet is obtained based on second information indicative of a location of the first information within the encapsulated packet. The encapsulating header is modified based on the first information.

DETAILED DESCRIPTION

Exemplary embodiments of the invention utilize schemes of data path widening and data forwarding to simplify the operation of modifying an encapsulating header based on flexibly positionable information within the encapsulated packet.

Figure 2:
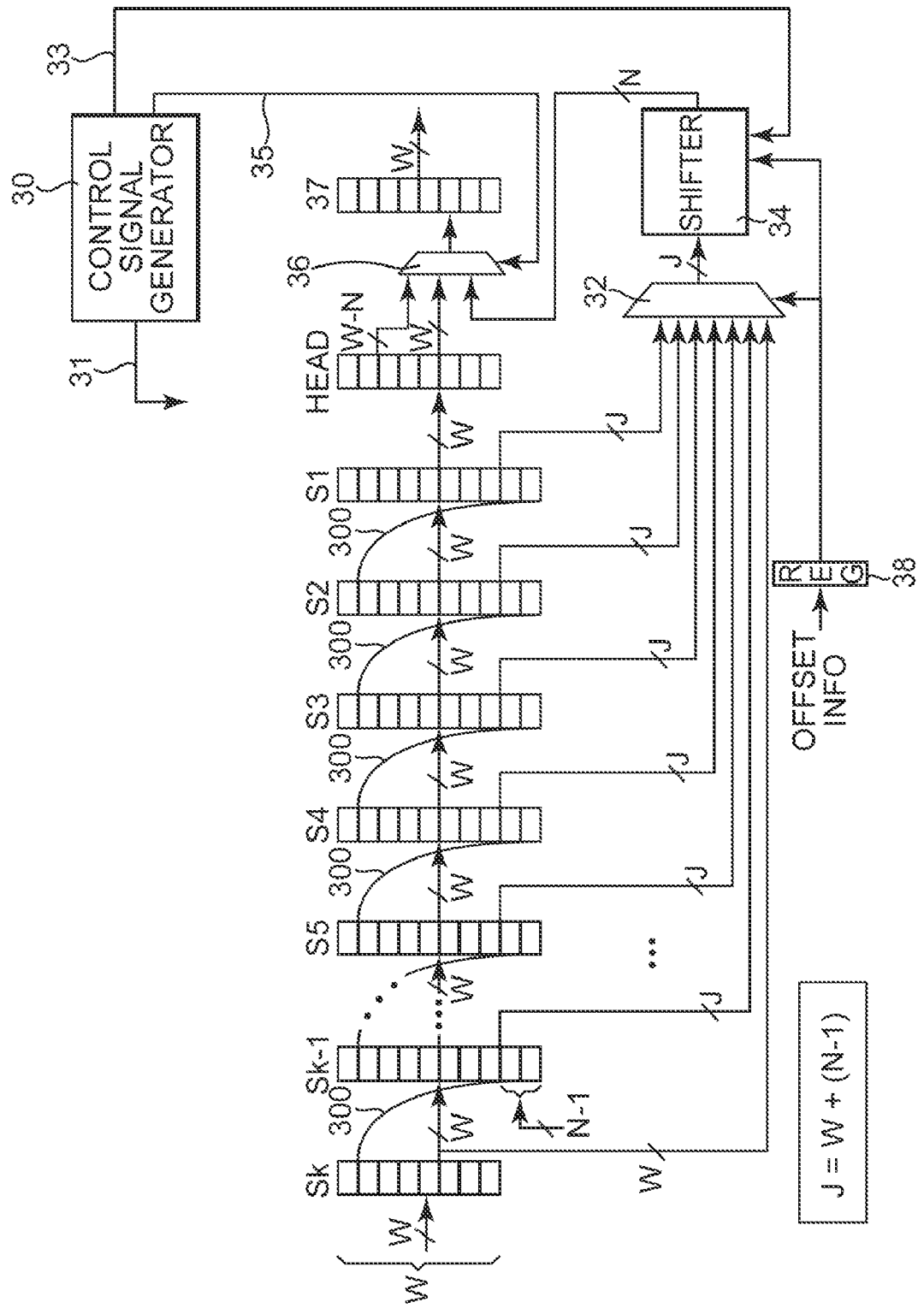
FIG. 2 diagrammatically illustrates exemplary embodiments of an apparatus according to the invention for modifying an encapsulating header based on flexibly positionable information in the encapsulated packet.

FIG. 2 diagrammatically illustrates exemplary embodiments of an apparatus which implements data path widening/data forwarding schemes according to the invention. The apparatus of FIG. 2 uses a multi-stage data pipeline to implement data path widening/data forwarding. In some embodiments, the pipeline stages include parallel-loadable/unloadable shift registers. In other embodiments, the pipeline stages are implemented by addressable memory locations and suitably controlled data pointers. In FIG. 2, the data path traversed by the encapsulation packet has a width of W bytes. The encapsulation packet is input to stage Sk of a k-stage portion of the pipeline. Stage Sk is W bytes wide, but the remainder of the stages S1-Sk–1 of the k-stage portion are wider than W bytes. Stages S1-Sk–1 are N–1 bytes wider than the W byte wide data path (and stage Sk), where N represents a number of adjacent bytes within the encapsulated packet that will be used to modify the encapsulating header.

Figure 1:
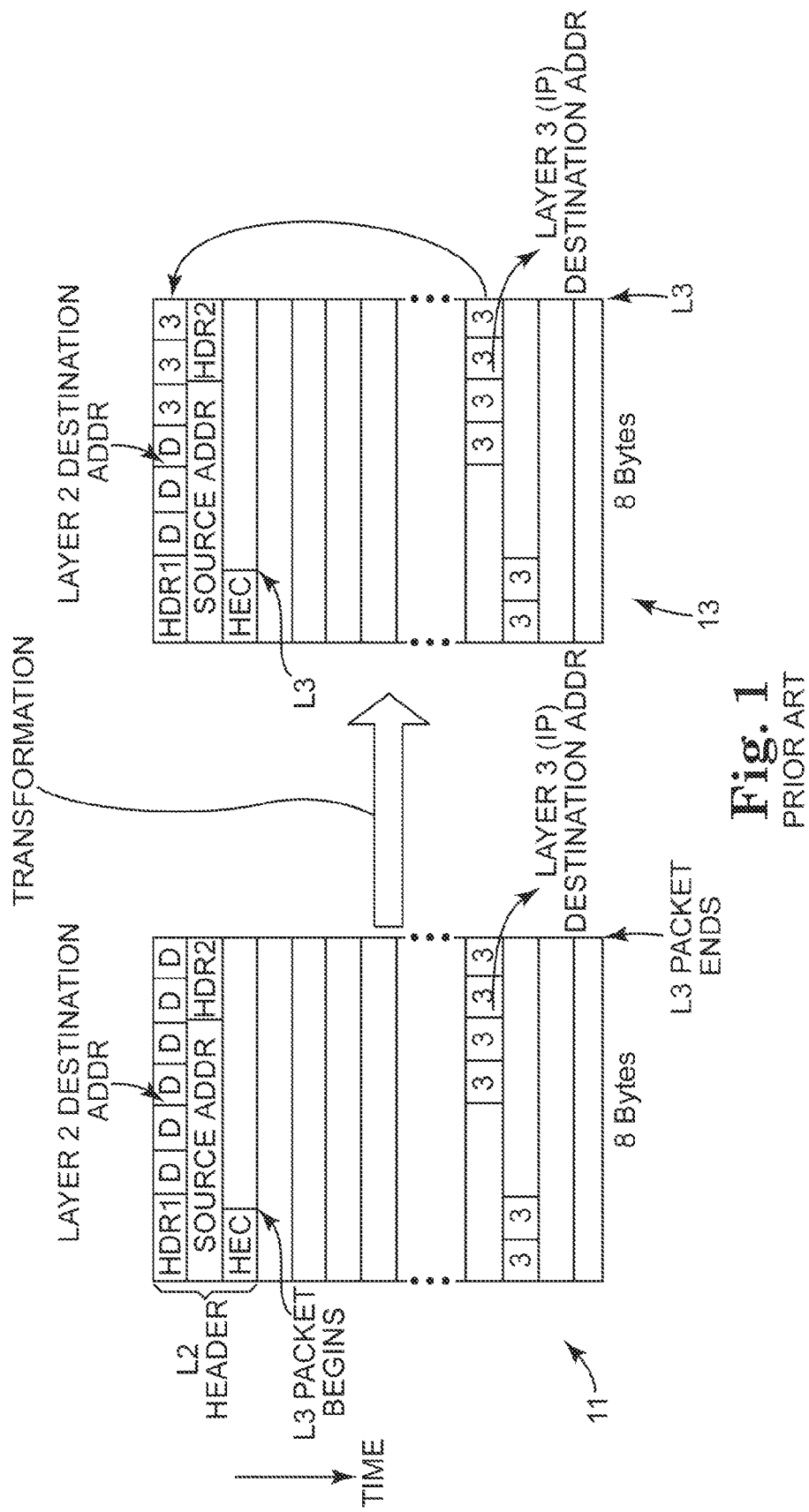
FIG. 1 conceptually illustrates a conventional example of modifying an encapsulating header based on information within the encapsulated packet.

In some embodiments, k is dependent upon the size of the encapsulated packet. Assuming, for example, that the adjacent bytes of the encapsulated packet (also referred to herein as the bytes of interest) that will be used to modify the encapsulating header can be positioned anywhere within the encapsulated packet, then k can be determined by dividing the number of bytes in the encapsulated packet by the byte width W of the data path. Referring again to the example of FIG. 1, if the packet 11 includes 128 bytes, then the layer 3 packet includes 110 bytes (128 total bytes minus 18 bytes of layer 2 header). In the example of FIG. 1, W=8, so 110 divided by 8 implies that k=14 stages would be needed in order to accommodate all 110 bytes of the layer 3 packet.

In the embodiments of FIG. 2, the HEAD portion of the pipeline includes enough pipeline stages (not explicitly shown in FIG. 2) such that, when the pipeline contains all bytes of the encapsulation packet, the k-stage portion of the pipeline will contain somewhere therein the N bytes of interest Thus, and continuing with the example of the encapsulation packet 11 of FIG. 1 with W=8, the HEAD portion of the pipeline would include two stages that respectively hold the first (top) two 8-byte segments of packet 11, and stage S1 would hold the third segment, namely the two HEC bytes of the layer 2 header along with the first six bytes of the layer 3 packet. The remaining 104 bytes of the layer 3 packet would be contained in stages S2-Sk, where k=14.

Although the exemplary embodiments of FIG. 2 show k≧7, FIG. 2 is illustrative only, and it should be readily understood that k can be as small as k=2, such that the pipeline would consist of the HEAD portion, together with stages S1 and S2. In, the embodiments of FIG. 2, stage S1 will include at least one byte that could be occupied by the flexibly positionable bytes of interest in the encapsulated packet.

As indicated above, the stages S1-Sk–1 have a width of W+(N–1), designated as J in FIG. 2. N is the number of adjacent bytes of the encapsulated packet that will be utilized to perform the desired modification of the encapsulating header. Each of the stages S1-Sk–1 thus accommodates the W bytes of the data transfer path, plus an additional N–1 bytes. For each of these k–1 stages in the pipeline, N–1 bytes are forwarded thereto from the immediately preceding (upstream) stage in the pipeline, as generally illustrated by the forwarding data paths 300. Each time that pipeline stages S2-Sk receive a new segment of W data bytes, the N–1 lowest order bytes (e.g., leftmost bytes in FIG. 1) of the new segment are also forwarded on data paths 300 to the next downstream stage in the pipeline.

Taking stage S3 as an example, when stage S3 receives a W-byte segment from stage S4, stage S4 is also receiving a W-byte segment from stage S5. When stage S4 receives the W-byte segment from stage S5, the N–1 lowest order bytes of that received segment are also transferred via the associated data path 300 to stage S3. Thus, when the pipeline is completely filled so as to ensure that all of the N bytes of interest are located somewhere within stages S1-Sk, each of the stages S1-Sk–1, through forwarding, effectively holds N–1 redundant bytes which are simultaneously held in the N–1 lowest order bytes of the next adjacent upstream stage (S2-Sk, respectively).

By ensuring that all N bytes of interest are contained somewhere within the pipeline stages S1-Sk, and further by forwarding the N–1 lowest order bytes of stages S2-Sk downstream to their respectively adjacent stages S1-Sk–1, it is ensured that one of the stages S1-Sk includes all N of the bytes of interest. This is true because the worst case situation would be where one of the N bytes of interest is the highest order byte (e.g., rightmost byte in FIG. 1) of a given segment, and the remaining N–1 bytes of interest are the lowest order bytes of the next successive segment within the packet. In this worst case situation, the forwarding of the lowest order N–1 bytes to the next adjacent downstream pipeline stage will ensure that all N bytes of interest are contained in parallel format within that next adjacent downstream pipeline stage.

At the point when the pipeline is full and all N bytes of interest are assured to be within one of the pipeline stages S1-Sk, that one pipeline stage is selected by a selector 32 in response to offset information received from an offset register 38. The offset register 38 is used to store selectively programmable offset information (for example a digital code) which indicates precisely where the N bytes of interest are located within the encapsulated packet. The offset information can indicate, for example, how far the first of the N bytes of interest is offset from the first byte of the encapsulation packet. In response to the offset information, selector 32 selects the one pipeline stage that contains all N bytes of interest. The data from the selected pipeline stage, either J bytes from one of stages S1-Sk–1 or W bytes from stage Sk, is passed through the selector 32 to a shifter 34. The shifter 34 is responsive to the offset information for shifting the received data bytes so that the N bytes of interest are provided at the N-byte output of the shifter 34. Thus, the shifter 34, selector 32 and offset register 38 are cooperable for routing the N bytes of interest from the pipeline to the output of shifter 34.

In the embodiments of FIG. 2, the N bytes of interest provided by shifter 34 are input to a selector 36. The selector 36 has a further input for receiving W-byte segments from the HEAD portion of the pipeline and also has a further input for receiving W−N-byte partial segments from the HEAD portion of the pipeline. The partial segment input is used when modifying the encapsulating header. FIG. 2 illustrates a situation similar to that of FIG. 1, wherein N bytes of the encapsulating header are replaced by N bytes from the encapsulated packet. When the encapsulating header is to be modified, the selector 36 selects the W−N-byte partial segment from the HEAD portion of the pipeline, together with the N bytes from the shifter 34. The resulting W bytes (including the N bytes of interest) are then transferred to an output stage 37. Thereafter, the selector 36 selects its W byte input in order to transfer the remaining W-byte segments of the encapsulation packet through to the output stage 37. When the next encapsulation packet fills the pipeline of FIG. 2, then the selector 36 again selects both its (W−N-byte) partial segment input and its N-byte input (from shifter 34) in order to appropriately modify the encapsulating header of the encapsulation packet currently contained within the pipeline.

A control signal generator 30 provides appropriate control signals to support the operations described above with respect to FIG. 2. A pipeline transfer signal 31 transfers the W-byte segments of the encapsulation packets through the pipeline stages. With each transfer into stages S2-Sk, the lowest N−1 bytes are also forwarded through concatenation from the stages S2-Sk into their respective adjacent downstream stages S1-Sk−1.

Once the control signal generator 30 has transferred the entire encapsulation packet into the pipeline of FIG. 2, and after the N−1 bytes are forwarded from the stages S2-Sk to S1-Sk−1, respectively, the control signal generator activates a shift signal 33. The shifter 34 is responsive to the shift signal 33 and the offset information 38 for appropriately shifting the parallel data bytes received from the selector 32 such that the N bytes of interest are produced at the N-byte output of shifter 34. This shifting operation will require anywhere from zero to W−1 byte shift operations, depending on the position of the N bytes of interest as indicated by the offset information.

With the shifting operation occurring, the control signal generator 30 provides control signal 35 (for example a digital code) such that the selector 36 selects its N-byte input and its W−N-byte (partial segment) input. This effectuates the desired modification of the encapsulating header, so the next activation of transfer signal 31 will transfer into the output stage 37 a W-byte segment that includes the modification of the encapsulating header. At this point the control signal generator 30 can change control signal 35 such that selector 36 selects its W-byte (full segment) input, so the remainder of the encapsulation packet can be transferred segment-by-segment out of the pipeline using transfer signal 31, and the next encapsulation packet can also be simultaneously transferred into the pipeline. When the next encapsulation packet fills the pipeline, the control signal generator 30 again provides the shift signal 33 and the selector control signal 35 in the same manner described above to complete the modification of the next encapsulating header.

Figure 3:
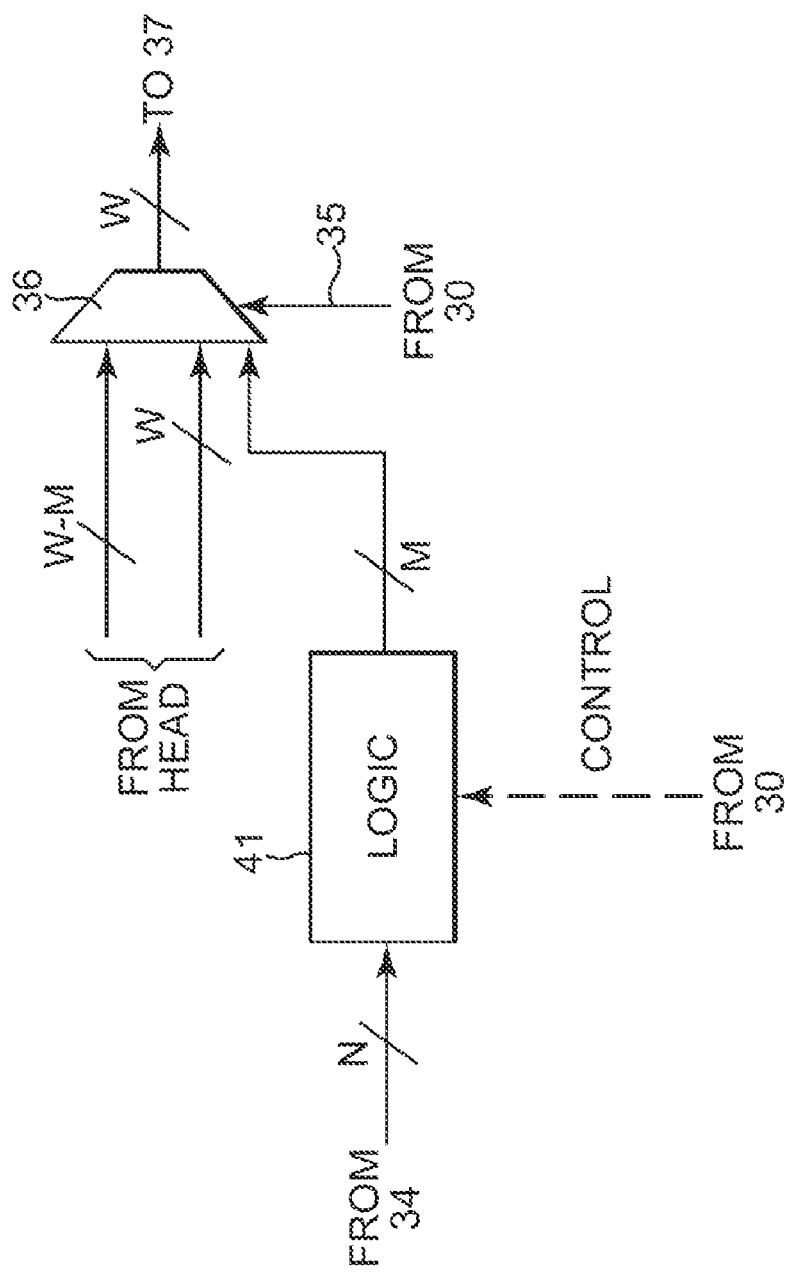
FIG. 3 diagrammatically illustrates further exemplary embodiments of an apparatus according to the invention for modifying an encapsulating header based on flexibly positionable information in the encapsulated packet.

It should be clear from the foregoing that, so long as the selectively programmable offset information is provided at 38, the apparatus of FIG. 2 can, without decreasing the data rate of packet transfer, identify and obtain any N bytes of interest within an encapsulated packet, and modify the encapsulating header in response to the N bytes. Although the example of FIG. 2 relates to directly replacing N bytes of the encapsulating header with N bytes from the encapsulated packet, other embodiments can utilize the N bytes from the encapsulated packet in any desired fashion to effectuate modification of the encapsulating header. FIG. 3 diagrammatically illustrates pertinent portions of such latter embodiments.

The embodiments of FIG. 3 are generally similar to those of FIG. 2, but include additional logic 41 at the output of shifter 34. This logic 41 receives the N bytes produced by shifter 34, and performs desired operations on those bytes to produce M bytes which are then applied to the input of selector 36, which also receives a W-byte (full-segment) input from the pipeline and a W−M-byte (partial segment) input from the pipeline. Thus, in the embodiments of FIG. 3, although M bytes of the encapsulating header are replaced, the M replacement bytes are not taken directly from the encapsulated packet, but rather are produced by logic 41 in response to N bytes obtained from the encapsulated packet. The logic at 41 can perform, for example, any desired logical and/or arithmetic operation(s). In various embodiments, N can be greater than, less than, or equal to M. In some embodiments the logic 41 is combinational logic. In other embodiments, the logic 41 is sequential logic whose operational timing is controlled by control signals received from the control signal generator 30. A control signal input for sequential logic is shown by a broken line in FIG. 3.

Although exemplary embodiments of the invention are described above in detail, this does not limit the scope of the invention, which can be practiced in a variety of embodiments.

What is claimed is:

1. An apparatus for processing an encapsulation packet including an encapsulating header and an encapsulated packet, comprising:
   a data pipeline having an input for receiving the encapsulation packet formatted as a sequence of parallel data segments, said data pipeline including a plurality of pipeline stages, each said pipeline stage for holding therein successive ones of said data segments;
   a modifier coupled to said data pipeline for replacing a portion of said encapsulating header with first information contained in said encapsulated packet; and
   selection logic coupled between said data pipeline and said modifier, said selection logic having an input for receiving selectively programmable second information indicative of a location of said first information within said encapsulated packet, said selection logic responsive to said second information for routing said first information from said data pipeline to said modifier.

2. The apparatus of claim 1, wherein said modifier is for removing header information from said encapsulating header.

3. The apparatus of claim 2, wherein said modifier is for replacing said removed header information with said first-mentioned information.

4. The apparatus of claim 1, wherein said selection logic includes a selector having an input coupled to said pipeline and having an output, and a shifter having an input coupled to said selector output and having an output coupled to said modifier.

5. The apparatus of claim 4, wherein said modifier includes a selector having an input coupled to said pipeline and to said output of said shifter.

6. The apparatus of claim 1, wherein said encapsulation packet is an OSI layer 2 packet, said encapsulating header is an OSI layer 2 header and said encapsulated packet is an OSI layer 3 packet.

7. The apparatus of claim 1, wherein said first information includes address information.

8. An apparatus for processing an encapsulation packet including an encapsulating header and an encapsulated packet, comprising:
- a data pipeline having an input for receiving the encapsulation packet formatted as a sequence of parallel data segments having a common data segment width, said data pipeline including a plurality of pipeline stages, each said pipeline stage for holding therein successive ones of said data segments, at least one of said pipeline stages having a data width that is greater than said common data segment width for holding therein a portion of the encapsulation packet that is larger than said data segments;
- a modifier coupled to said data pipeline for replacing a portion of said encapsulating header with information contained in said encapsulated packet; and
- selection logic coupled between said data pipeline and said modifier for routing said information from said data pipeline to said modifier.

9. The apparatus of claim 8, wherein said portion of the encapsulation packet includes one of said data segments and part of another of said data segments.

10. The apparatus of claim 9, wherein said part of said another data segment includes a portion of said information.

11. The apparatus of claim 9, wherein said one and another data segments are adjacent one another in said sequence.

12. The apparatus of claim 11, wherein said another data segment follows said one data segment in said sequence.

13. An apparatus for processing an encapsulation packet including an encapsulating header and an encapsulated packet, comprising:
- a data pipeline having an input for receiving the encapsulation packet formatted as a sequence of parallel data segments, said data pipeline including a plurality of pipeline stages, each said pipeline stage for holding therein successive ones of said data segments, one of said pipeline stages coupled to an adjacent stage of said pipeline for combining, in said adjacent pipeline stage, part of a data segment currently held in said one pipeline stage with a data segment currently held in said adjacent pipeline stage;
- a modifier coupled to said data pipeline for modifying said encapsulating header in response to information contained in said encapsulated packet; and
- selection logic coupled between said data pipeline and said modifier for routing said information from said data pipeline to said modifier.

14. The apparatus of claim 13, wherein said one pipeline stage is upstream from said adjacent pipeline stage in said data pipeline.

15. The apparatus of claim 13, wherein said part of said data segment currently held in said one pipeline stage includes a portion of said information.

16. A method of processing an encapsulation packet including an encapsulating header and an encapsulated packet, comprising:
- receiving the encapsulation packet formatted as a sequence of parallel data segments in a data pipeline of a network device, said encapsulated packet including information for use in modifying said encapsulating header;
- insuring that said information is available in said sequence of parallel data segments, including combining a first of said parallel data segments and part of a second of said parallel data segments in a stage of said data pipeline occupied by said first parallel data segment as said sequence of parallel data segments advances in said data pipeline, wherein said first and second parallel data segments are in adjacent stages to one another in said data pipeline; and
- modifying said encapsulating header based on said parallel-formatted information.

17. The method of claim 16, wherein said second parallel data segment follows said first parallel data segment in said sequence.

18. The method of claim 16, wherein said part of said second parallel data segment includes a portion of said information.

19. An apparatus for processing an encapsulation packet including an encapsulating header and an encapsulated packet, comprising:
- means for receiving the encapsulation packet formatted as a sequence of parallel data segments in a data pipeline, said encapsulated packet including information for use in modifying said encapsulating header;
- means for insuring that said information is available in said data pipeline, including means for combining a first of said parallel data segments with a portion of a second of said parallel data segments in a same stage of said data pipeline as said sequence of parallel data segments advances in said data pipeline, wherein said first and second parallel data segments are in adjacent stages to one another in said data pipeline; and means for modifying said encapsulating header based on said parallel-formatted information.

20. A method of processing an encapsulation packet including an encapsulating header and an encapsulated packet, comprising:
- receiving the encapsulation packet as a sequence of parallel-formatted data segments in a data pipeline comprising a plurality of stages;
- advancing the data segments through consecutive stages of the data pipeline such that at least some of the stages include a complete data segment and a partial data segment from a preceding stage, the partial data segment comprising redundant information within the data pipeline;
- receiving selectively programmable first information indicative of a location of second information within said encapsulated packet;
- obtaining said second information from said encapsulated packet based on said first information; and
- replacing a portion of said encapsulating header with said second information, wherein said encapsulation packet is advanced through the stages of the data pipeline without decreasing a data rate of the encapsulation packet.

* * * * *